US012571739B2

(12) United States Patent
Gerland

(10) Patent No.: US 12,571,739 B2
(45) Date of Patent: Mar. 10, 2026

(54) MEASUREMENT DEVIATION ANALYSIS FOR A SEMICONDUCTOR SPECIMEN

(71) Applicant: Applied Materials Israel Ltd., Rehovot (IL)

(72) Inventor: Elazar Lars Gerland, Jerusalem (IL)

(73) Assignee: Applied Materials Israel Ltd., Rehovot (IL)

( * ) Notice: Subject to any disclaimer, the term of this patent is extended or adjusted under 35 U.S.C. 154(b) by 411 days.

(21) Appl. No.: 18/091,314

(22) Filed: Dec. 29, 2022

(65) Prior Publication Data

US 2024/0219313 A1 Jul. 4, 2024

(51) Int. Cl.
*G01N 21/95* (2006.01)
*G01N 21/84* (2006.01)
*G01N 21/88* (2006.01)

(52) U.S. Cl.
CPC ..... *G01N 21/9501* (2013.01); *G01N 21/8851* (2013.01); *G01N 2021/8461* (2013.01); *G01N 2021/8854* (2013.01); *G01N 2021/887* (2013.01); *G01N 2021/8883* (2013.01)

(58) Field of Classification Search
None
See application file for complete search history.

(56) References Cited

U.S. PATENT DOCUMENTS

| | | | | |
|---|---|---|---|---|
| 6,940,592 B2 * | 9/2005 | Borden | .............. | G01N 21/9501 |
| | | | | 250/559.27 |
| 2011/0320149 A1 * | 12/2011 | Lee | .......................... | H01L 22/20 |
| | | | | 702/83 |
| 2015/0234000 A1 * | 8/2015 | Butler | ..................... | H01L 22/20 |
| | | | | 324/759.03 |
| 2018/0314148 A1 * | 11/2018 | Tetiker | ................ | H01J 37/3244 |

* cited by examiner

*Primary Examiner* — Matthew G Marini
(74) *Attorney, Agent, or Firm* — Lowenstein Sandler LLP

(57) ABSTRACT

There is provided a system and method of examining a specimen. The method comprises obtaining an actual measurement in response to scanning the specimen using a set of scanning parameters with predefined values; obtaining a simulated measurement based on design data; comparing the actual measurement with the simulated measurement to identify a deviation with respect to a predefined tolerance; identifying at least one structural property as root cause of the deviation by: obtaining one or more additional actual measurements in response to scanning the specimen using one or more varying values of at least one scanning parameter; and providing the actual measurement and the additional actual measurements to a simulation model representative of simulated measurement distribution in a multidimensional property space characterized by the structural properties of the plurality of layers and the at least one scanning parameter, thereby identifying the at least one structural property.

20 Claims, 5 Drawing Sheets

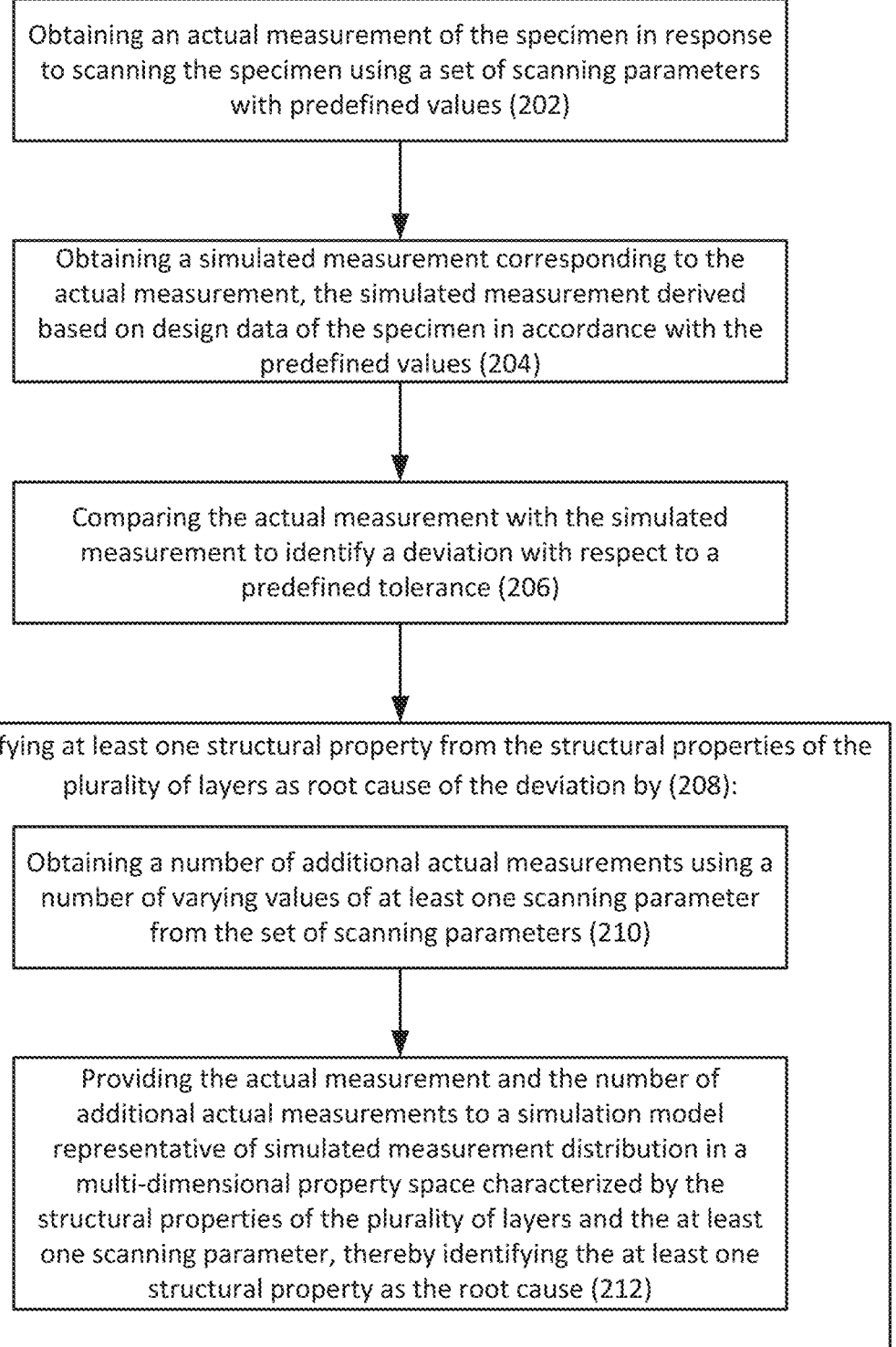

Obtaining an actual measurement of the specimen in response to scanning the specimen using a set of scanning parameters with predefined values (202)

Obtaining a simulated measurement corresponding to the actual measurement, the simulated measurement derived based on design data of the specimen in accordance with the predefined values (204)

Comparing the actual measurement with the simulated measurement to identify a deviation with respect to a predefined tolerance (206)

Identifying at least one structural property from the structural properties of the plurality of layers as root cause of the deviation by (208):

Obtaining a number of additional actual measurements using a number of varying values of at least one scanning parameter from the set of scanning parameters (210)

Providing the actual measurement and the number of additional actual measurements to a simulation model representative of simulated measurement distribution in a multi-dimensional property space characterized by the structural properties of the plurality of layers and the at least one scanning parameter, thereby identifying the at least one structural property as the root cause (212)

FIG. 2

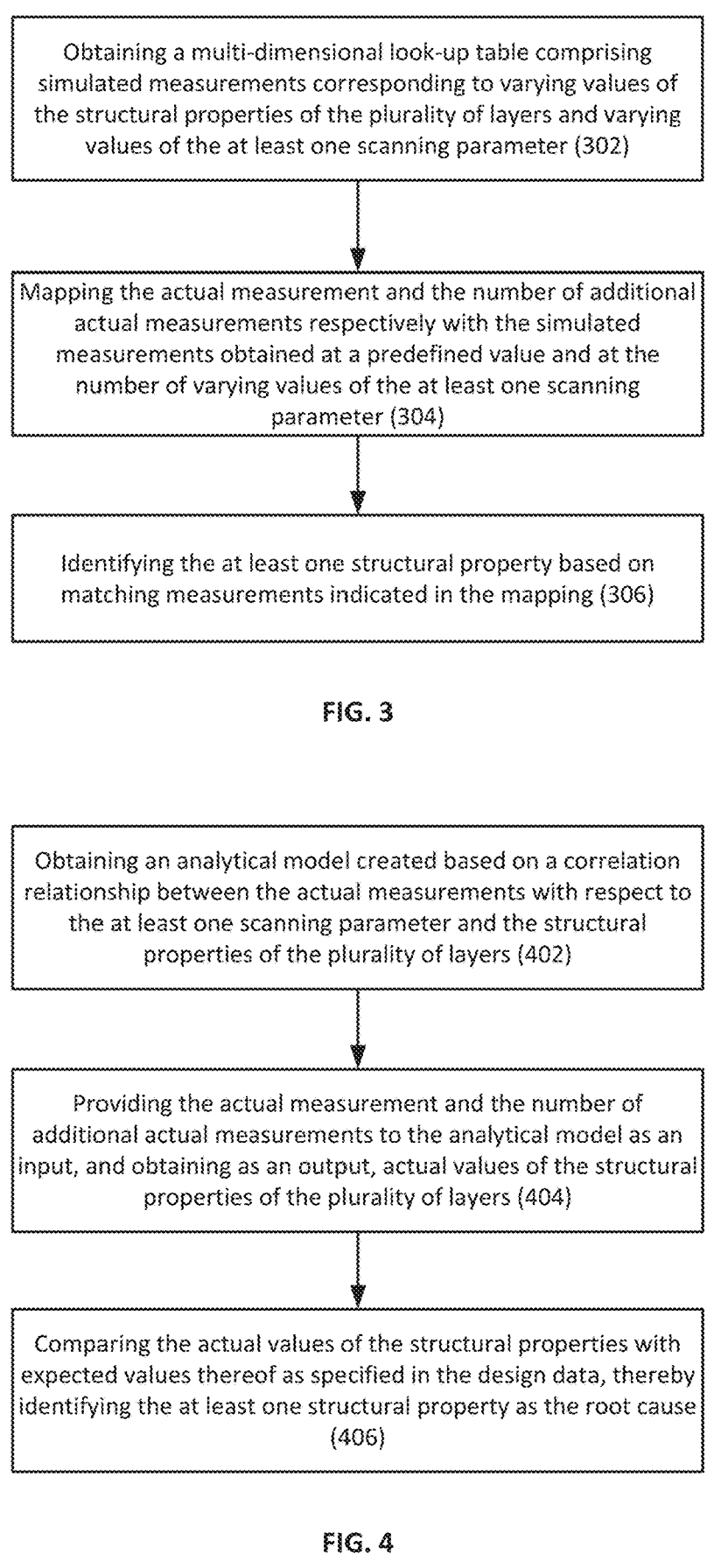

Obtaining a multi-dimensional look-up table comprising simulated measurements corresponding to varying values of the structural properties of the plurality of layers and varying values of the at least one scanning parameter (302)

Mapping the actual measurement and the number of additional actual measurements respectively with the simulated measurements obtained at a predefined value and at the number of varying values of the at least one scanning parameter (304)

Identifying the at least one structural property based on matching measurements indicated in the mapping (306)

FIG. 3

Obtaining an analytical model created based on a correlation relationship between the actual measurements with respect to the at least one scanning parameter and the structural properties of the plurality of layers (402)

Providing the actual measurement and the number of additional actual measurements to the analytical model as an input, and obtaining as an output, actual values of the structural properties of the plurality of layers (404)

Comparing the actual values of the structural properties with expected values thereof as specified in the design data, thereby identifying the at least one structural property as the root cause (406)

| H2\H3 (nm) | 40 | 45 | 50 | 55 | 60 | 65 | 70 | 75 | 80 | 85 | 90 | 95 | 100 | 105 | 110 | 115 | 120 | 125 | 130 | 135 | 140 | 145 |
|---|---|---|---|---|---|---|---|---|---|---|---|---|---|---|---|---|---|---|---|---|---|---|
| 15 | 0.540 | 0.543 | 0.546 | 0.550 | 0.553 | 0.556 | 0.559 | 0.562 | 0.566 | 0.569 | 0.572 | 0.575 | 0.579 | 0.582 | 0.585 | 0.588 | 0.592 | 0.595 | 0.598 | 0.602 | 0.605 | 0.608 |
| 16 | 0.561 | 0.564 | 0.567 | 0.570 | 0.574 | 0.577 | 0.580 | 0.584 | 0.587 | 0.590 | 0.594 | 0.597 | 0.600 | 0.604 | 0.607 | 0.610 | 0.614 | 0.617 | 0.621 | 0.624 | 0.627 | 0.631 |
| 17 | 0.581 | 0.585 | 0.588 | 0.591 | 0.595 | 0.598 | 0.601 | 0.605 | 0.608 | 0.612 | 0.615 | 0.619 | 0.622 | 0.625 | 0.629 | 0.632 | 0.636 | 0.639 | 0.643 | 0.646 | 0.650 | 0.653 |
| 18 | 0.602 | 0.605 | 0.609 | 0.612 | 0.615 | 0.619 | 0.622 | 0.626 | 0.629 | 0.633 | 0.636 | 0.640 | 0.643 | 0.647 | 0.651 | 0.654 | 0.658 | 0.661 | 0.665 | 0.668 | 0.672 | 0.676 |
| 19 | 0.622 | 0.626 | 0.629 | 0.633 | 0.636 | 0.640 | 0.644 | 0.647 | 0.651 | 0.654 | 0.658 | 0.661 | 0.665 | 0.669 | 0.672 | 0.676 | 0.680 | 0.683 | 0.687 | 0.691 | 0.694 | 0.698 |
| 20 | 0.643 | 0.646 | 0.650 | 0.654 | 0.657 | 0.661 | 0.665 | 0.668 | 0.672 | 0.676 | 0.679 | 0.683 | 0.687 | 0.690 | 0.694 | 0.698 | 0.702 | 0.705 | 0.709 | 0.713 | 0.717 | 0.721 |
| 21 | 0.663 | 0.667 | 0.671 | 0.674 | 0.678 | 0.682 | 0.686 | 0.689 | 0.693 | 0.697 | 0.701 | 0.704 | 0.708 | 0.712 | 0.716 | 0.720 | 0.724 | 0.728 | 0.731 | 0.735 | 0.739 | 0.743 |

702

| H2\H3 (nm) | 40 | 45 | 50 | 55 | 60 | 65 | 70 | 75 | 80 | 85 | 90 | 95 | 100 | 105 | 110 | 115 | 120 | 125 | 130 | 135 | 140 | 145 |
|---|---|---|---|---|---|---|---|---|---|---|---|---|---|---|---|---|---|---|---|---|---|---|
| 15 | 0.288 | 0.289 | 0.289 | 0.290 | 0.291 | 0.291 | 0.292 | 0.292 | 0.293 | 0.293 | 0.294 | 0.295 | 0.295 | 0.296 | 0.296 | 0.297 | 0.297 | 0.298 | 0.299 | 0.299 | 0.300 | 0.300 |
| 16 | 0.293 | 0.294 | 0.295 | 0.295 | 0.296 | 0.296 | 0.297 | 0.297 | 0.298 | 0.299 | 0.299 | 0.300 | 0.300 | 0.301 | 0.301 | 0.302 | 0.302 | 0.303 | 0.304 | 0.304 | 0.305 | 0.305 |
| 17 | 0.298 | 0.299 | 0.300 | 0.300 | 0.301 | 0.301 | 0.302 | 0.302 | 0.303 | 0.304 | 0.304 | 0.305 | 0.306 | 0.306 | 0.307 | 0.307 | 0.308 | 0.308 | 0.309 | 0.309 | 0.310 | 0.310 |
| 18 | 0.303 | 0.304 | 0.305 | 0.305 | 0.306 | 0.306 | 0.307 | 0.307 | 0.308 | 0.309 | 0.309 | 0.310 | 0.310 | 0.311 | 0.312 | 0.312 | 0.313 | 0.313 | 0.314 | 0.315 | 0.315 | 0.316 |
| 19 | 0.308 | 0.309 | 0.310 | 0.310 | 0.311 | 0.311 | 0.312 | 0.313 | 0.313 | 0.314 | 0.314 | 0.315 | 0.315 | 0.316 | 0.317 | 0.317 | 0.318 | 0.318 | 0.319 | 0.320 | 0.320 | 0.321 |
| 20 | 0.313 | 0.314 | 0.315 | 0.315 | 0.316 | 0.316 | 0.317 | 0.318 | 0.318 | 0.319 | 0.319 | 0.320 | 0.320 | 0.321 | 0.322 | 0.322 | 0.323 | 0.324 | 0.324 | 0.325 | 0.325 | 0.326 |
| 21 | 0.318 | 0.319 | 0.320 | 0.320 | 0.321 | 0.321 | 0.322 | 0.323 | 0.323 | 0.324 | 0.324 | 0.325 | 0.326 | 0.326 | 0.327 | 0.327 | 0.328 | 0.329 | 0.329 | 0.330 | 0.330 | 0.331 |

FIG. 7

MEASUREMENT DEVIATION ANALYSIS FOR A SEMICONDUCTOR SPECIMEN

TECHNICAL FIELD

The presently disclosed subject matter relates, in general, to the field of examination of a semiconductor specimen, and more specifically, to measurement analysis for a semiconductor specimen.

BACKGROUND

Current demands for high density and performance associated with ultra large-scale integration of fabricated devices require submicron features, increased transistor and circuit speeds, and improved reliability. As semiconductor processes progress, pattern dimensions such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Examination can be provided by using non-destructive examination tools during or after manufacture of the specimen to be examined. Examination generally involves generating certain output (e.g., images, signals, etc.) for a specimen by directing light or electrons to the wafer and detecting the light or electrons from the wafer. A variety of non-destructive examination tools includes, by way of non-limiting example, scanning electron microscopes, atomic force microscopes, optical inspection tools, etc.

Examination processes can include a plurality of examination steps. The manufacturing process of a semiconductor device can include various procedures such as etching, depositing, planarization, growth such as epitaxial growth, implantation, etc. The examination steps can be performed a multiplicity of times, for example after certain process procedures, and/or after the manufacturing of certain layers, or the like. Additionally or alternatively, each examination step can be repeated multiple times, for example for different wafer locations, or for the same wafer locations with different examination settings.

Examination processes are used at various steps during semiconductor fabrication for purpose of process control, such as, e.g., defect detection and classification processes, as well as metrology related operations. Effectiveness of examination can be improved by automatization of process (es) such as, for example, defect detection, Automatic Defect Classification (ADC), Automatic Defect Review (ADR), image segmentation, automated metrology-related operations, etc.

Automated examination systems ensure that the parts manufactured meet the quality standards expected and provide useful information on adjustments that may be needed to the manufacturing tools, equipment, and/or compositions, depending on the type of defects/measurements identified.

SUMMARY

In accordance with certain aspects of the presently disclosed subject matter, there is provided a computerized system for examining a semiconductor specimen, the semiconductor specimen comprising a plurality of layers characterized by respective structural properties, the system comprising a processor and memory circuitry (PMC) configured to: obtain an actual measurement of the semiconductor specimen in response to scanning the semiconductor specimen using a set of scanning parameters with predefined values; obtain a simulated measurement corresponding to the actual measurement, the simulated measurement derived based on design data of the semiconductor specimen in accordance with the predefined values; compare the actual measurement with the simulated measurement to identify a deviation with respect to a predefined tolerance; identify at least one structural property from the structural properties of the plurality of layers as root cause of the deviation by: obtaining one or more additional actual measurements in response to scanning the semiconductor specimen using one or more varying values of at least one scanning parameter from the set of scanning parameters; and providing the actual measurement and the one or more additional actual measurements to a simulation model representative of simulated measurement distribution in a multi-dimensional property space characterized by the structural properties of the plurality of layers and the at least one scanning parameter, thereby identifying the at least one structural property as the root cause.

In addition to the above features, the system according to this aspect of the presently disclosed subject matter can comprise one or more of features (i) to (xiii) listed below, in any desired combination or permutation which is technically possible:

(i). The structural properties comprise one or more geometric properties and/or one or more material properties of the plurality of layers.

(ii). The system further comprises an electron beam tool operatively connected to the PMC and configured to scan the semiconductor specimen using the set of scanning parameters with predefined values and generate image data representative thereof by collecting backscattered electrons emitted from the specimen. The actual measurement is obtained based on the image data.

(iii). The actual measurement is one of a contrast measurement, a gray level profile or measurement derived therefrom, and a critical dimension (CD) measurement.

(iv). The set of scanning parameters comprises: landing energy, energy filter, tilt, and angular filter of an electron beam tool.

(v). The simulation model is generated during a setup phase prior to runtime examination, and the simulated measurement is obtained using the simulation model to correspond to expected values of the structural properties of the layers as specified in the design data.

(vi). The simulation model is generated in runtime, in response to the identification of the deviation.

(vii). The simulation model comprises data informative of a multi-dimensional lookup table comprising simulated measurements corresponding to varying values of the structural properties of the plurality of layers and the one or more varying values of the at least one scanning parameter.

The actual measurement and the one or more additional actual measurements are respectively mapped with the simulated measurements obtained at a predefined value and at the one or more varying values of the at least one scanning parameter. The at least one structural property is identified based on matching measurements indicated in the mapping.

(viii). The simulation model is an analytical model created based on a correlation relationship between the actual measurements with respect to the at least one scanning parameter and the structural properties of the plurality of layers.

The simulation model, given the actual measurement and the one or more additional actual measurements as an input, is capable of providing, as an output, actual values of the structural properties of the plurality of layers, which, when being compared with expected values thereof as specified in the design data, identifying the at least one structural property as the root cause.

(ix). The simulation measurement is obtained by simulating one or more effects caused by one or more physical processes of the semiconductor specimen including a fabrication process, a scanning process in accordance with the predefined values, and a signal processing process.

(x). The at least one scanning parameter is selected from the set of scanning parameters based on dependency of actual measurements on varying values of each scanning parameter in the set of scanning parameters. In some cases, the dependency is related to general structural properties of the specimen including thickness of the specimen, the number of the plurality of layers, and the structural properties of the plurality of the layers.

(xi). The number of the one or more varying values of the at least one scanning parameter is determined based on the number of structural properties of the plurality of layers having unknown values.

(xii). The identified root cause is usable for modifying a processing step of a fabrication process that is related to the root cause.

(xiii). The semiconductor specimen is an overlay target.

In accordance with other aspects of the presently disclosed subject matter, there is provided a method of examining a semiconductor specimen, the semiconductor specimen comprising a plurality of layers characterized by respective structural properties, the method comprising: obtaining an actual measurement of the semiconductor specimen in response to scanning the semiconductor specimen using a set of scanning parameters with predefined values; obtaining a simulated measurement corresponding to the actual measurement, the simulated measurement derived based on design data of the semiconductor specimen in accordance with the predefined values; comparing the actual measurement with the simulated measurement to identify a deviation with respect to a predefined tolerance; identifying at least one structural property from the structural properties of the plurality of layers as root cause of the deviation by: obtaining one or more additional actual measurements in response to scanning the semiconductor specimen using one or more varying values of at least one scanning parameter from the set of scanning parameters; and providing the actual measurement and the one or more additional actual measurements to a simulation model representative of simulated measurement distribution in a multi-dimensional property space characterized by the structural properties of the plurality of layers and the at least one scanning parameter, thereby identifying the at least one structural property as the root cause.

This aspect of the disclosed subject matter can comprise one or more of features (i) to (xiii) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of examining a semiconductor specimen, the semiconductor specimen comprising a plurality of layers characterized by respective structural properties, the method comprising: obtaining an actual measurement of the semiconductor specimen in response to scanning the semiconductor specimen using a set of scanning parameters with predefined values; obtaining a simulated measurement corresponding to the actual measurement, the simulated measurement derived based on design data of the semiconductor specimen in accordance with the predefined values; comparing the actual measurement with the simulated measurement to identify a deviation with respect to a predefined tolerance; identifying at least one structural property from the structural properties of the plurality of layers as root cause of the deviation by: obtaining one or more additional actual measurements in response to scanning the semiconductor specimen using one or more varying values of at least one scanning parameter from the set of scanning parameters; and providing the actual measurement and the one or more additional actual measurements to a simulation model representative of simulated measurement distribution in a multi-dimensional property space characterized by the structural properties of the plurality of layers and the at least one scanning parameter, thereby identifying the at least one structural property as the root cause.

This aspect of the disclosed subject matter can comprise one or more of features (i) to (xiii) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which:

FIG. 2 illustrates a generalized flowchart of examining a semiconductor specimen for identifying the root cause of a measurement deviation in accordance with certain embodiments of the presently disclosed subject matter.

FIG. 3 illustrates a generalized flowchart of using a lookup table for identifying the root cause in accordance with certain embodiments of the presently disclosed subject matter.

FIG. 4 illustrates a generalized flowchart of using an analytical model for identifying the root cause in accordance with certain embodiments of the presently disclosed subject matter.

FIG. 7 shows an example of a lookup table used for identifying the root cause of deviation in accordance with certain embodiments of the presently disclosed subject matter.

DETAILED DESCRIPTION OF EMBODIMENTS

Figure 1:
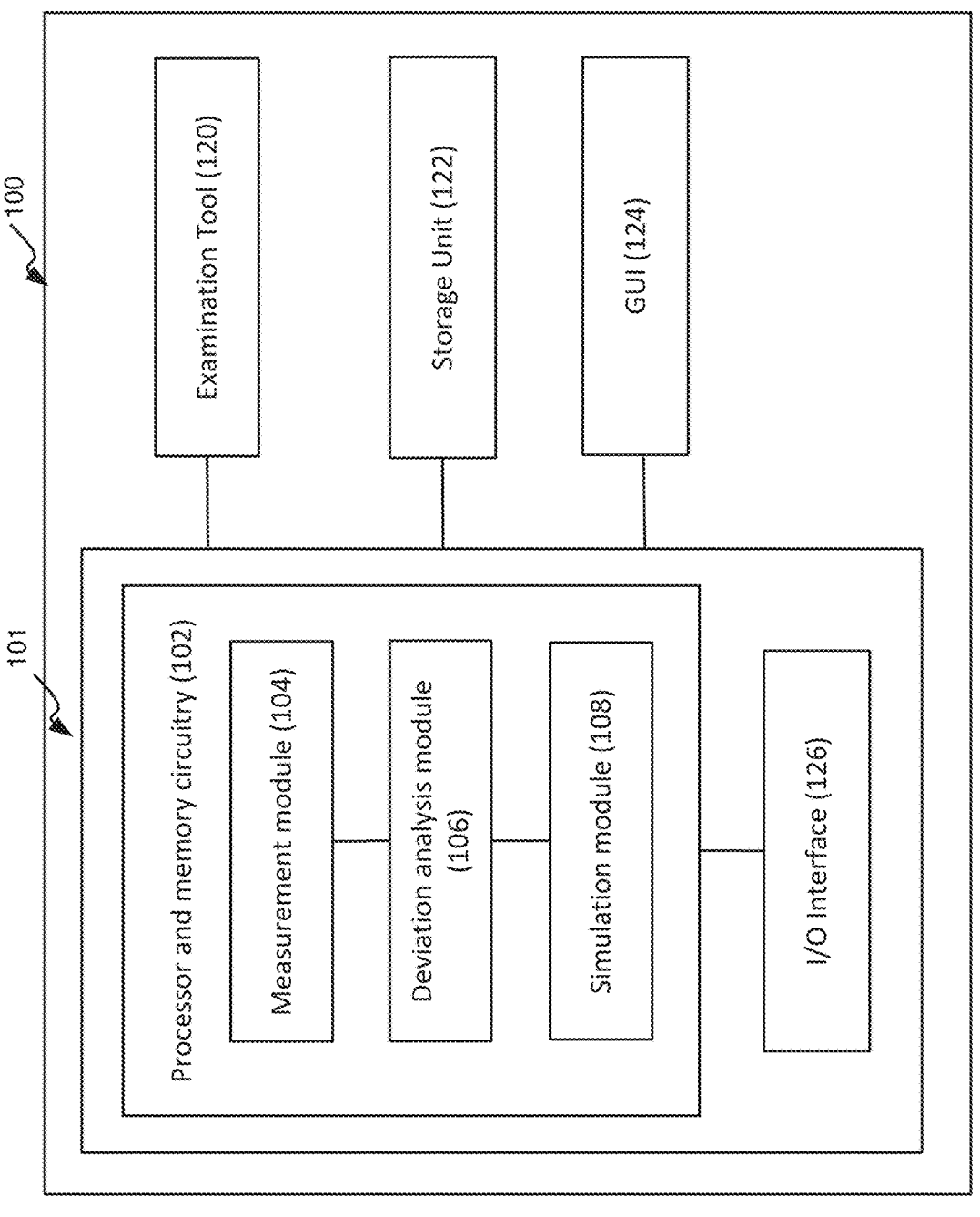
FIG. 1 illustrates a generalized block diagram of an examination system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components, and circuits, have not been described in detail so as not to obscure the presently disclosed subject matter.

Unless specifically stated otherwise, as apparent from the following discussions, it is appreciated that throughout the specification discussions utilizing terms such as "examining", "obtaining", "comparing", "identifying", "providing", "scanning", "generating", "collecting", "mapping", "simulating", "selecting", "determining", "modifying", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the measurement analysis system, and respective parts thereof disclosed in the present application.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

The term "specimen" used in this specification should be expansively construed to cover any kind of physical objects or substrates including wafers, masks, reticles, and other structures, combinations, and/or parts thereof used for manufacturing semiconductor integrated circuits, magnetic heads, flat panel displays, and other semiconductor-fabricated articles. A specimen is also referred to herein as a semiconductor specimen, and can be produced by manufacturing equipment executing corresponding manufacturing processes.

The term "examination" used in this specification should be expansively construed to cover any kind of operations related to defect detection, defect review and/or defect classification of various types, segmentation, and/or metrology operations during and/or after the specimen fabrication process (also referred to as the manufacturing process). Examination is provided by using non-destructive examination tools during or after manufacture of the specimen to be examined. By way of non-limiting example, the examination process can include runtime scanning (in a single or in multiple scans), imaging, sampling, detecting, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes (SEM), atomic force microscopes (AFM), optical inspection tools, etc.

The term "metrology operation" used in this specification should be expansively construed to cover any metrology operation procedure used to extract metrology information relating to one or more structural elements on a semiconductor specimen. In some embodiments, the metrology operations can include measurement operations, such as, e.g., critical dimension (CD) measurements performed with respect to certain structural elements on the specimen, including but not limiting to the following: dimensions (e.g., line widths, line spacing, contact diameters, size of the element, edge roughness, gray level statistics, etc.), shapes of elements, distances within or between elements, related angles, overlay information associated with elements corresponding to different design levels, etc. Measurement results such as measured images are analyzed, for example, by employing image-processing techniques. Note that, unless specifically stated otherwise, the term "metrology" or derivatives thereof used in this specification, are not limited with respect to measurement technology, measurement resolution, or size of inspection area.

The term "defect" used in this specification should be expansively construed to cover any kind of abnormality or undesirable feature/functionality formed on a specimen. In some cases, a defect may be a defect of interest (DOI) which is a real defect that has certain effects on the functionality of the fabricated device, thus is in the customer's interest to be detected. For instance, any "killer" defects that may cause yield loss can be indicated as a DOI. In some other cases, a defect may be a nuisance (also referred to as "false alarm" defect) which can be disregarded because it has no effect on the functionality of the completed device and does not impact yield.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats, as, by way of non-limiting examples, GDSII format, OASIS format, etc. Design data can be presented in vector format, grayscale intensity image format, or otherwise.

The term "image(s)" or "image data" used in the specification should be expansively construed to cover any original images/frames of the specimen captured by an examination tool during the manufacturing process, derivatives of the captured images/frames obtained by various pre-processing stages, and/or computer-generated synthetic images (in some cases based on design data). It is to be noted that in some cases the image data referred to herein can include, in addition to images (e.g., captured images, processed images, etc.), numeric data associated with the images (e.g., metadata, hand-crafted attributes, etc.). It is further noted that image data can include data related to one or more of the following: a processing step of interest, a layer of interest, a plurality of processing steps, and/or a plurality of layers of the specimen.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

The process of semiconductor manufacturing often requires multiple sequential processing steps and/or layers, each one of which could possibly cause errors that may lead to yield loss. Examples of various processing steps can include lithography, etching, depositing, planarization, growth (such as, e.g., epitaxial growth), and implantation, etc. Various examination operations, such as defect-related examination, and/or metrology-related examination, can be performed at different processing steps/layers during the manufacturing process to monitor and control the process. The examination operations can be performed a multiplicity of times, for example after certain processing steps, and/or after the manufacturing of certain layers, or the like.

As described above, various types of examination tools can be used for performing examination of a semiconductor specimen. By way of example, scanning electron microscopes (SEM) is a type of electron microscope that produces images of a specimen by scanning the specimen with a focused beam of electrons. SEM is capable of accurately inspecting and measuring features during the manufacture of semiconductor wafers. The electrons interact with atoms in the specimen, producing various signals that contain information on the surface topography and/or composition of the specimen.

Specifically, when an electron beam strikes a specimen, different types of signals are generated. Secondary electrons (SEs) originate from the surface or the near-surface regions of the specimen. They are a result of inelastic interactions between the primary electron beam and the specimen, and have lower energy. Specifically, SEs are produced when an incident electron excites an electron in the specimen and loses some of its energy in the process. The excited electron moves towards the surface of the specimen and, if it still has sufficient energy, it escapes from the surface as a secondary electron. The shallow depth of production of detected SEs makes them ideal for examining topography of the specimen's surface.

Additionally, backscattered electrons (BSEs) are reflected back after elastic interactions between the beam and the specimen. This type of electrons originates from a broader and deeper region within the interaction volume in the specimen. They are a result of elastic collisions of electrons with atoms, which result in a change in the electrons' trajectory. Specifically, when the electron beam strikes the specimen, some of the electrons are deflected from their original path by atoms in the specimen in an elastic fashion (no loss of energy). These essentially elastically scattered primary electrons (which are high-energy electrons) that rebound from the sample, are referred to as BSEs.

BSEs and SEs can be collected by different detectors of the SEM tool. As described, BSEs come from deeper regions of the sample, while SEs originate from surface regions. Therefore, BSEs and SEs carry different types of information. For instance, images generated based on BSEs show high sensitivity to differences in atomic number, therefore can carry information on the specimen's interior structure and/or composition (i.e., this is referred to as the see-through ability of the BSEs to probe the specimen in depth when provided with enough landing energy), whereas images generated based on SEs can provide more detailed surface information.

As semiconductor processes progress, semiconductor devices are developed with increasingly complex three-dimensional structures which have deeper layers and various material composition. When examining a semiconductor specimen having multiple layers, the electron yield from the specimen, such as the BSEs, represents an overall response of the beam from all penetrated layers. A signal (such as, e.g., a measurement from the SEM image) produced based on the overall response is informative of the interior structure of all the penetrated layers of the specimen.

During examination, when the signal demonstrates a deviation from a corresponding reference signal, it is difficult, and in many cases impossible, to find the root cause of such deviation (e.g., which layer(s) and what specific structural property of such layer(s) caused the deviation). This is because each multiple layer has respective structural properties such as, e.g., geometrical properties and/or material properties, whose actual values as presented in the manufactured specimen remain unknown. Due to the number of unknown properties characterizing the multiple layers of the specimen, it is generally not feasible to properly correlate the properties with the resulting signal, as it is impossible to retrieve the values of all unknown properties based on one measurement signal. In many cases, in order to identify the root cause property, the specimen has to be destroyed using a destructive tool such as TEM.

Accordingly, certain embodiments of the presently disclosed subject matter propose a system and method for identifying the root cause of a measurement deviation in a semiconductor specimen having multi-layer structure, without using a destructive tool, as will be detailed below.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g., a wafer, a die, or parts thereof) as part of the specimen fabrication process. As described above, the examination referred to herein can be construed to cover any kind of operations related to defect inspection/detection, defect review, defect classification, segmentation, and/or metrology operations, such as, e.g., metrology measurements, etc., with respect to the specimen. System 100 comprises one or more examination tools 120 configured to scan a specimen and capture images thereof to be further processed for various examination applications.

The term "examination tool(s)" used herein should be expansively construed to cover any tools that can be used in examination-related processes including, by way of non-limiting example, scanning, imaging, sampling, reviewing, measuring, classifying and/or other processes provided with regard to the specimen or parts thereof. The examination tools 120 can be implemented as machines of various types. In some embodiments, the examination tool can be implemented as an electron beam machine/tool, such as e.g., Scanning Electron Microscope (SEM), Atomic Force Microscopy (AFM), or Transmission Electron Microscope (TEM), etc.

In some cases, at least one of the examination tools 120 has metrology capabilities. Such an examination tool is also referred to as a metrology tool. The metrology tool can be configured to generate image data in response to scanning the specimen and perform metrology operations based on the image data. Depending on the specific way of scanning (e.g., one-dimensional scan such as line scanning, two-dimensional scan in both x and y directions, or dot scanning at specific spots, etc.), the image data can be represented in different formats, such as, e.g., as a gray level profile, a two-dimensional image, or discrete pixels, etc.

The resulting image data can be transmitted—directly or via one or more intermediate systems—to system 101. The present disclosure is not limited to any specific type of examination tools and/or the representation/resolution of image data resulting from the examination tools.

According to certain embodiments of the presently disclosed subject matter, the examination system 100 comprises a computer-based system 101 operatively connected to the examination tools 120 and capable of identifying the root cause of a measurement deviation in a semiconductor specimen based on runtime image data of the specimen obtained during specimen fabrication and simulated image data, as will be detailed below. System 101 is also referred to as a measurement analysis system.

Specifically, system 101 includes a processor and memory circuitry (PMC) 102 operatively connected to a hardware-based I/O interface 126. The PMC 102 is configured to provide processing necessary for operating the system, as further detailed with reference to FIGS. 2-4, and comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC.

The processor referred to herein can represent one or more general-purpose processing devices such as a microprocessor, a central processing unit, or the like. More particularly, the processor may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processor may also be one or more special-purpose processing devices such as an application specific integrated circuit (ASIC), a field programmable gate array (FPGA), a digital signal processor (DSP), a network processor, or the like. The processor is configured to execute instructions for performing the operations and steps discussed herein.

The memory referred to herein can comprise a main memory (e.g., read-only memory (ROM), flash memory, dynamic random access memory (DRAM) such as synchronous DRAM (SDRAM) or Rambus DRAM (RDRAM), etc.), and a static memory (e.g., flash memory, static random access memory (SRAM), etc.).

One or more functional modules comprised in the PMC 102 of system 101 can include a measurement module 104, a deviation analysis module 106 and a simulation module 108 that can be operatively connected to each other. Specifically, the examination tool 120 (e.g., an electron beam tool) can be configured to scan the specimen (or at least part thereof) using a set of scanning parameters with predefined values (also referred to as the original scan or the initial scan), giving rise to image data representative of the specimen. Upon receiving the image data from the examination tool 120, the measurement module 104 can be configured to obtain an actual measurement of the specimen based on the image data. The simulation module 108 can be configured to obtain a simulated measurement corresponding to the actual measurement. The simulated measurement can be derived based on design data of the specimen in accordance with the set of scanning parameters with the predefined values.

The deviation analysis module 106 can be configured to compare the actual measurement with the simulated measurement to identify a deviation with respect to a predefined tolerance. For purpose of identifying the root cause of the deviation, i.e., to find at least one structural property from the structural properties of the plurality of layers that causes the deviation, the examination tool 120 can be configured to scan the specimen one or more times (in addition to the original scan, thus also referred to as an additional scan) using one or more varying values of at least one scanning parameter from the set of scanning parameters, giving rise to additional image data. The measurement module 104 can be configured to obtain one or more additional actual measurements based on the additional image data. The deviation analysis module 106 can be configured to provide the actual measurement and the one or more additional actual measurements to a simulation model representative of simulated measurement distribution in a multi-dimensional property space characterized by the structural properties of the plurality of layers and the at least one scanning parameter, thereby identifying at least one structural property as the root cause.

Operation of systems 100 and 101, the PMC 102, and the functional modules therein will be further detailed with reference to FIGS. 2-4.

In some cases, additionally to system 101, the examination system 100 can comprise one or more examination modules, such as, e.g., metrology operation module, defect detection module, Automatic Defect Review Module (ADR), Automatic Defect Classification Module (ADC), and/or other examination modules which are usable for examination of a semiconductor specimen. The one or more examination modules can be implemented as stand-alone computers, or their functionalities (or at least part thereof) can be integrated with the examination tool 120. In some cases, the output of system 101, e.g., the identified root cause, can be provided to the one or more examination modules for further processing.

According to certain embodiments, system 100 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store actual image data of the specimen and/or derivatives thereof produced by the examination tool 120, and/or simulated image data. Accordingly, these input data can be retrieved from the storage unit 122 and provided to the PMC 102 for further processing. The output of the system 101, such as the identified root cause, can be sent to storage unit 122 to be stored.

In some embodiments, system 100 can optionally comprise a computer-based Graphical User Interface (GUI) 124 which is configured to enable user-specified inputs related to system 101. For instance, the user can be presented with a visual representation of the specimen (for example, by a display forming part of GUI 124), including image data of the specimen, etc. The user may be provided, through the GUI, with options of defining certain operation parameters, such as, e.g., values of the set of scanning parameters. The user may also view the operation results or intermediate processing results, such as, e.g., the identified deviation, the root cause thereof, etc., on the GUI. In some cases, system 101 can be further configured to send certain output to the storage unit 122, and/or external systems (e.g., yield management system (YMS) of a fabrication plant (FAB)) for controlling a processing step of the fabrication process that is related to the root cause. A yield management system (YMS) in the context of semiconductor manufacturing is a data management, analysis, and tool system that collects data from the FAB, especially during manufacturing ramp ups, and helps engineers find ways to improve yield. YMS helps semiconductor manufacturers and FABs manage high volumes of production analysis with fewer engineers. These systems analyze the yield data and generate reports. YMS can be used by Integrated Device Manufacturers (IMD), FABs, fabless semiconductor companies, and Outsourced Semiconductor Assembly and Test (OSAT).

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

It is noted that the system illustrated in FIG. 1 can be implemented in a distributed computing environment, in which the aforementioned components and functional modules shown in FIG. 1 can be distributed over several local and/or remote devices, and can be linked through a communication network. By way of example, the examination tool 120 and the system 101 can be located at the same entity (in some cases hosted by the same device) or distributed over different entities, depending on specific system configurations and implementation needs.

It is further noted that in some embodiments at least some of examination tools 120, storage unit 122 and/or GUI 124 can be external to the examination system 100 and operate in data communication with systems 100 and 101 via I/O interface 126. System 101 can be implemented as stand-alone computer(s) to be used in conjunction with the examination tools, and/or with the additional examination modules as described above. Alternatively, the respective functions of the system 101 can, at least partly, be integrated with one or more examination tools 120, thereby facilitating and enhancing the functionalities of the examination tools 120 in examination-related processes.

While not necessarily so, the process of operation of systems 101 and 100 can correspond to some or all of the stages of the methods described with respect to FIGS. 2-4. Likewise, the methods described with respect to FIGS. 2-4 and their possible implementations can be implemented by systems 101 and 100. It is therefore noted that embodiments discussed in relation to the methods described with respect to FIGS. 2-4 can also be implemented, mutatis mutandis, as various embodiments of the systems 101 and 100, and vice versa.

Referring to FIG. 2, there is illustrated a generalized flowchart of examining a semiconductor specimen for identifying the root cause of a measurement deviation in accordance with certain embodiments of the presently disclosed subject matter.

As described above, a semiconductor specimen is typically made of multiple layers characterized by respective structural properties. By way of example, the structural properties of a given layer can refer to one or more geometric properties and/or material properties characterizing the given layer. For instance, geometric properties of a given layer can include, e.g., thickness/height of the layer, CD of certain structural features on the layer (in cases where the layer comprises one or more structural features), and angles between different materials of the same or different layers, etc. Material properties can include, e.g., density of the material forming the layer, and atomic number of the material, etc.

The examination process of a specimen can be performed a multiplicity of times during the fabrication process of the specimen, for example following the manufacturing of specific layers. In cases where a given layer comprises structural features of which the manufacturing process may include various processing steps such as, e.g., lithography, etching, filling, depositing, polishing, recessing, planarization, growth (such as epitaxial growth), and implantation, etc., the examination process of such a layer can follow certain processing steps of the structural features.

It is to be noted that the examination process disclosed herein for purpose of identifying root cause of a measurement deviation can be performed following any layer and/or processing steps thereof. The present disclosure should not be limited to the specific number of layers comprised in the specimen and/or the specific composition of the layers.

Figure 5:
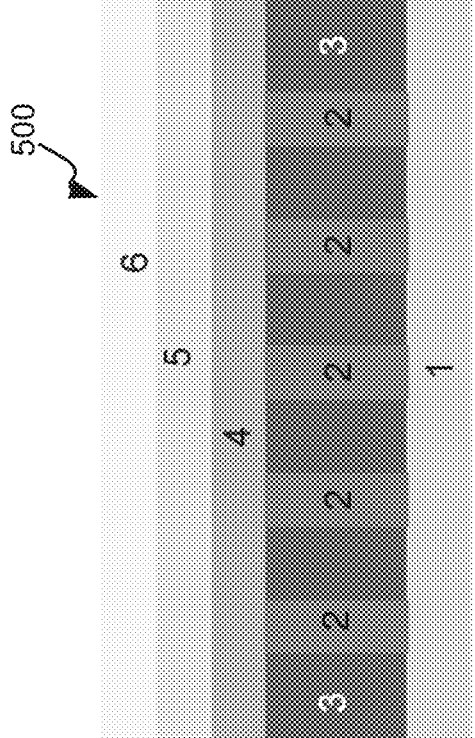
FIG. 5 is a schematic cross-section view of a semiconductor specimen with a multi-layer structure in accordance with certain embodiments of the presently disclosed subject matter.

FIG. 5 illustrates a schematic cross-section view of an exemplary semiconductor specimen with a multi-layer structure in accordance with certain embodiments of the presently disclosed subject matter.

The exemplified specimen 500 is composed of six layers (each layer being denoted with a layer number 1-6). The bottom layer (layer 1) is a substrate layer. Layers 2-6 are manufactured in sequence on the basis of layer 1. In the present example, layer 2 is embedded within layer 3 and comprises a plurality of structural features such as, e.g., contacts. Layers 4-6 are flat layers deposited on top. Each of the layers can be characterized by structural properties such as geometric properties and/or material properties. For instance, each of layers 1-6 is characterized by their respective layer thickness and material density, etc., of which the actual property values (as present in the manufactured specimen) are unknown.

An actual measurement of the specimen can be obtained (202) (e.g., by the measurement module 104 in PMC 102), in response to scanning the specimen (e.g., by the examination tool 120) using a set of scanning parameters with predefined values.

In some embodiments, the examination tool 120 can be implemented as an electron beam machine/tool, such as e.g., Scanning Electron Microscope (SEM), Atomic Force Microscopy (AFM), or Transmission Electron Microscope (TEM), etc. The electron beam tool is operatively connected to the PMC 102 of system 101 and configured to scan the specimen using the set of scanning parameters with the predefined values (also referred to hereinafter as the initial scan or the original scan, for purpose of differentiating from the additional scan as described below). The set of scanning parameters that characterize the examination tool can include one or more of the following: landing energy of the electron beam, energy filter of the detector, tilt (of the specimen surface), angular filter of the detector, focus, and any other scanning parameter of the electron beam tool.

As described above, for purpose of reflecting interior structure of the specimen, backscattered electrons (BSEs) emitted from the specimen can be collected. The electron yield of the BSEs represents an overall response of the beam from all penetrated layers of the specimen. Image data representative of the specimen can be generated based on the collected BSEs. Depending on the specific way of scanning, the image data can be represented in different formats. By way of example, in cases where the specimen is scanned in one dimension, e.g., along a line in x or y direction (i.e., one-dimensional scan), the image data can be represented as a gray level profile representative of the gray level distribution along the line (this is also referred to as line scanning). By way of another example, in cases where the specimen is scanned in both x and y directions (i.e., two-dimensional scan), the image data can be represented as a two-dimensional image. By way of yet further example, in cases where the specimen is scanned at specific spots, such as discrete locations on the wafer, the image data can be represented as a map of discrete pixels representative of the gray level distribution at respective locations (this is also referred to as dot scanning).

The actual measurement can refer to any type of measurement data that can be derived from the image data, including but not limited to, e.g., a gray level profile/distribution or measurement derived therefrom, a contrast measurement indicative of the range/difference of color or brightness in an image, a CD measurement, etc.

Figure 6:
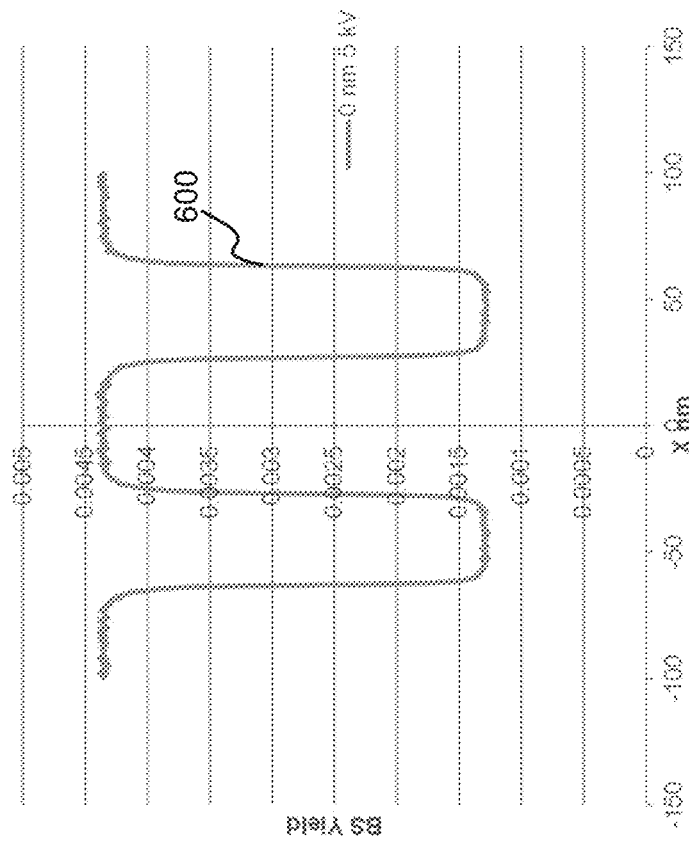
FIG. 6 shows an example of a gray level profile obtained in response to scanning a specimen in accordance with certain embodiments of the presently disclosed subject matter.

FIG. 6 illustrates an example of a gray level profile obtained in response to scanning a specimen in accordance with certain embodiments of the presently disclosed subject matter.

Assume the specimen to be scanned is the exemplified specimen 500 in FIG. 5. An electron beam (e-beam) tool, such as SEM, can be used to scan the specimen, thereby generating image data representative of the specimen. For instance, the image data can be generated by collecting the BSEs emitted from the specimen. Assume the specimen is scanned in both x and y directions, the image data is thus in the form of a SEM image. The gray level profile 600 can be derived from the SEM image, e.g., by averaging the pixel values along the direction that is normal to the longitudinal direction of the structural features in layer 2. Alternatively, in cases where the specimen is scanned in one dimension (e.g., along the direction that is normal to the longitudinal direction of the structural features), the image data as acquired is directly represented in the form of the gray level profile 600. The gray level profile 600 is represented in a waveform signal presenting two gray level values: the peak represents the BSE yield from the portions embedding the structural features in layer 2, and the bottom represents the BSE yield of the remaining portions. As mentioned above, the BSE yield represents an overall response from all the penetrated layers of the specimen. In one example, the measurement data derived from the gray level profile can be represented directly as the two gray level values (i.e., two GL measurements). In another example, the measurement data derived from the gray level profile can be a contrast measurement, e.g., a contrast ratio computed based on a difference between the two gray level values and the averaged gray level values thereof.

A simulated measurement corresponding to the actual measurement can be obtained (204) (e.g., by the simulation module 108 in PMC 102). The simulated measurement is derived based on design data of the specimen in accordance with the predefined values of the set of scanning parameters.

In some embodiments, the simulated measurement can be obtained by simulating one or more effects caused by one or more physical processes of the semiconductor specimen, such as, e.g., a fabrication process, a scanning process in accordance with the set of scanning parameters with the predefined values, and a signal processing process, giving rise to a simulated image, and obtaining the simulated measurement from the simulated image. The simulation of the various effects is described below in detail.

Physical effects caused by the fabrication process (FP) of the specimen can be simulated (also referred to as FP simulation) based on the design data (e.g., CAD) of the specimen. The simulation output after the FP simulation represents how the design patterns in the design data would actually appear on the wafer. In other words, the FP simulation transfers the design intent layout to the expected processed pattern on the wafer. Such simulation is also referred as stepper simulation, and can be performed, e.g., by convolving the CAD data (e.g., in the form of rasterized CAD) with a stepper beam shape filter. The stepper simulation assumes a Gaussian shape of the stepper optical beam. For example, the patterns on the wafer can be defined as thresholding of convolution of the binary CAD image with a Gaussian filter simulating the stepper optical beam shape.

Physical effects caused by the scanning process can be simulated (also referred to as scanning simulation) based on the FP simulation output. The scanning process refers to the process when the specimen is scanned by the examination tool (e.g., the e-beam tool) using the set of scanning parameters, thereby generating an examination signal (e.g., the e-beam signal). The scanning simulation aims to simulate the e-beam signal based on yield of electrons emitted from the specimen and detected by a detector for purpose of further signal processing. Such simulation is performed under the same scanning condition as of the acquisition of the actual image data and actual measurement, i.e., in accordance with the set of scanning parameters with the predefined values. By way of example, the specimen can be scanned by a SEM beam of a SEM tool with a predefined landing energy (as defined in the set of scanning parameters), and a BSE signal can be generated based on the BSEs emitted from the specimen and the amount detected by a BSE detector configured with certain scanning parameters such as, e.g., energy filter and/or angular filter (as predefined in the set of scanning parameters). As known, a SEM beam has a Gaussian shape. By way of example, the BSE signal as emitted from the specimen can be simulated by a convolution of wafer electron yield (such as the BSE yield) with the SEM beam (represented by a SEM point spread function (PSF)). The wafer electron yield can be defined based on wafer topography as presented in the simulation output resulting from the FP simulation and material properties of the specimen. The BSE signal as detected by the detector can be simulated based on the emitted signal as simulated and the detector configuration.

Physical effects caused by the signal processing process of the e-beam tool can be simulated based on the scanning simulation output. The signal processing process refers to the signal processing path where the examination signal (e.g., the BSE signal) is processed by the signal processing module in the examination tool, giving rise to an output simulated image to be examined (e.g., a SEM image). The signal processing simulation reflects influence of the signal path on both signal and noise. The simulated image after the signal processing simulation is a simulated SEM image, or, to be more specific, a simulated BSE image.

In some embodiments, the above-described simulation process can be performed by a simulation model (e.g., as comprised in the simulation module 108 in the PMC 102), in cases where such a model is generated during a setup phase prior to the runtime examination. Details of the simulation model will be described below with reference to block 212 of FIG. 2, as well as FIGS. 3 and 4. Once the simulated image is generated in accordance with the above-described simulation process, a simulated measurement corresponding to the actual measurement can be derived from the simulated image. By way of example, when the actual measurement is a contrast measurement such as, e.g., a contrast ratio calculated based on gray level values in the actual image data, the same measurement can be derived accordingly from the simulated image.

The actual measurement as obtained in block 202 can be compared (206) (e.g., by the deviation analysis module 106 in PMC 102) with the simulated measurement as obtained in block 204, to identify a deviation therebetween with respect to a predefined tolerance. By way of example, the predefined tolerance can be specified as a threshold, a ratio/percentage, a range, etc., depending on the type of measurement data. For instance, in cases where the measurement is a contrast measurement, the actual contrast and the simulated contrast can be compared to obtain a difference therebetween. The difference is compared with the predefined tolerance, and if it is above the tolerance, a deviation is identified. The predefined tolerance in such cases can be defined as a ratio or a percentage between the difference and the simulated/actual contrast.

As described above, it is not feasible to identify the root cause of the deviation based on one actual measurement, due to the number of unknown structural properties (e.g., geometrical properties and/or material properties) characterizing the multiple layers of the specimen, of which the values cannot be retrieved based on one measurement signal. In many cases, the specimen has to be destroyed using a destructive tool in order to identify the root cause property.

For purpose of addressing this problem, the present disclosure proposes a solution for identifying the root cause of the deviation from the various structural properties of the multiple layers of the specimen without using destructive measures. Generally, this can be done by performing additional scanning of the specimen using different scanning parameters (e.g., varying values of at least one scanning parameter of the set of scanning parameters), and acquiring additional actual measurements which are provided to a specifically configured simulation model to identify the root cause property.

Specifically, at least one structural property can be identified (208) (e.g., by the deviation analysis module 106) from the structural properties of the plurality of layers as root cause of the deviation. The identification can be performed as follows: obtaining (210) (e.g., by the measurement module 104) one or more additional actual measurements in response to scanning the specimen (e.g., by the examination tool 120, in addition to the initial scan, thus also referred to herein as additional scan) using one or more varying values of at least one scanning parameter from the set of scanning parameters, and providing (212) the actual measurement and the one or more additional actual measurements to a simulation model (e.g., as comprised in the simulation module 108) representative of simulated measurement distribution in a multi-dimensional property space characterized by the structural properties of the plurality of layers and the at least one scanning parameter, thereby identifying the at least one structural property as the root cause.

The additional scan of the specimen with reference to block 210 is performed when a deviation between the actual measurement and the simulated measurement is identified (as described with reference to block 206), for purpose of collecting additional measurement data to supplement the initial measurement data, thereby enabling retrieving the actual values of the structural properties for the multiple layers.

The additional scan and measurement can be performed in a similar manner as described above with reference to block 202. The value of at least one scanning parameter from the set of scanning parameters can be varied one or more times, and the specimen can be scanned using the varied value(s) of the at least one scanning parameter, together with the other scanning parameters in the set. In some embodiments, the at least one scanning parameter whose value is to be varied can be selected from the set of scanning parameters based on the dependency of actual measurements on varying values of each scanning parameter in the set of scanning parameters, i.e., how the changes of each scanning parameter's value can affect the changes of the actual measurements. Such dependency may relate to general structural properties of the specimen, such as, e.g., thickness of the specimen, the number of layers, materials of the layers, structural patterns/features of each layer, etc.

By way of example, the landing energy of the beam can be selected as the at least one structural property in cases where the changes of values of the landing energy can result in changing measurements of a specific specimen, i.e., when the measurements have different energy dependencies with respect to the structure (e.g., materials/geometrics) of the layers. By way of another example, the angular filter of the detector can be selected in cases where the measurements have different angular dependencies with respect to the structure (e.g., materials/geometrics) of the layers. The values of the selected structural property can be varied within a predefined range and with an appropriate interval.

In some cases, the number of the one or more varying values of the at least one scanning parameter can be determined based on the number of structural properties of the plurality of layers having unknown values. In some cases, more than one structural property can be selected from the set and used in combination for the purpose of deriving more additional measurements. For instance, in the example of FIG. 5 where the specimen is composed of six layers and each layer is characterized by respective layer thickness and material density whose actual property values are unknown, there are in total 12 structural properties (i.e., 2 properties per layer*6 layers) with unknown values. For the purpose of deriving the values of these properties, at least an equivalent number of measurement data are required.

As described in FIG. 6, the gray level profile 600 resulting from the initial scan can provide two gray level values as two measurements. For obtaining sufficient measurements, another five additional scans are needed to obtain five gray level profiles which can provide ten additional measurements. This can be done, e.g., by selecting at least one scanning parameter, such as, e.g., the landing energy, and varying the value thereof five times (e.g., varying from the predefined value with an interval), thereby obtaining the additional gray level profiles. In another example, multiple scanning parameters, such as both landing energy and energy filter, can be selected where the value of each parameter can be varied a few times so as to obtain sufficient additional measurements together. In some cases, the values of the multiple scanning parameters can be varied at the same time for a specific scanning of the specimen.

Once the additional measurements are obtained, the actual measurement resulting from the original scan and the one or more additional actual measurements resulting from the additional scan can be provided to a simulation model to identify the root cause, as described with reference to block 212. The simulation model is generated to represent a simulated measurement distribution in a multi-dimensional property space. The multiple dimensions in the multi-dimensional property space include: the structural properties of the plurality of layers each as a dimension, and the at least one scanning parameter as a dimension. The simulation model can be generated and used in various ways, as exemplified below with reference to FIGS. 3 and 4.

FIG. 3 illustrates a generalized flowchart of using a lookup table for identifying the root cause in accordance with certain embodiments of the presently disclosed subject matter.

In some embodiments, the simulation model includes data informative of a multi-dimensional lookup table comprising simulated measurements corresponding to varying values of the structural properties of the plurality of layers and varying values of the at least one scanning parameter. It is to be noted that although the term "lookup table" is used in the present example, it is for illustrative purposes only and should not be regarded as limiting the present disclosure. The simulation model can be represented by other suitable types of data representation, such as, e.g., an array, a list, an index, or a graphical representation (e.g., a graph, a plot, a chart, etc.), in lieu of the table representation.

The simulation model (e.g., the multi-dimensional lookup table in the example) can be obtained (302) (e.g., by the simulation module 108). In some embodiments, the simulation model can be pre-generated during a setup phase prior to the runtime examination. In some other cases, the simulation model can be generated in runtime, in response to identification of the deviation with reference to block 206.

The actual measurement and the one or more additional actual measurements are respectively mapped (304) (e.g., by deviation analysis module 106) with the simulated measurements obtained at a predefined value (one of the predefined values as initially set) and at the one or more varying values of the at least one scanning parameter. Specifically, the actual measurement (obtained during the initial scan) is mapped with the simulated measurements obtained at the predefined value of the at least one scanning parameter (as represented in the simulation model), thereby identifying one or more matching measurements (also referred to as first matching measurements). The one or more additional actual measurements (obtained during the additional scan using a number of varying values of the at least one scanning parameter) are respectively mapped with the simulated measurements obtained at the one or more varying values of the at least one scanning parameter (as represented in the simulation model), thereby identifying one or more matching measurements (also referred to as second matching measurements).

At least one structural property from the structural properties of the plurality of layers can be identified (306) as the root cause based on matching measurements indicated in the mapping. By way of example, the first matching measurements as identified in the mapping between the actual measurement (obtained during the initial scan) and the simulated measurements obtained at the predefined value, and the second matching measurements as identified in the mapping between the one or more additional actual measurements and the simulated measurements obtained at the one or more varying values of the at least one scanning parameter, can be compared, and the actual values of the structural properties of the layers can be determined as the ones resulting in both the first and second matching measurements.

Referring to FIG. 7, there is illustrated an example of a lookup table used for identifying the root cause of a deviation in accordance with certain embodiments of the presently disclosed subject matter.

For purpose of easy illustration, assume a simplified specimen having three layers: a substrate bottom layer, a second layer (layer 2) on top of the bottom layer and made of gold, and a third layer (layer 3) covering the second layer and made of silicon-oxide. The second layer and third layer are flat layers without specific structural features. The expected layer thickness for the second layer, as specified in the design data of the specimen, is 20 nm. The expected layer thickness for the third layer, as specified in the design data of the specimen, is 100 nm. The actual layer thickness of the two layers are two unknown structural properties of the specimen.

During the initial scan of the specimen, the e-beam tool is configured with a beam having a landing energy of 10 keV. The actual measurement (e.g., BSE yield representative of the average number of emitted BSEs over the electrons of the primary beam), resulting from the initial scan, is 0.622. A simulated measurement under the same level of landing energy is computed to be 0.687 based on the design data. A deviation between the two measurements is identified. As there are two unknown structural properties of the two layers, it is impossible to identify, based on one actual measurement, which layer is not manufactured as designed, thus causing the deviation, as further demonstrated in the lookup table 700.

The look-up table 700 illustrates simulated measurements corresponding to varying thickness values of layer 2 and layer 3, which are obtained under the same landing energy of 10 keV. As shown, the rows of table 700 list varying values of the thickness of layer 2 (denoted as H2), ranging from 15-21 nm. The columns of table 700 list varying values of the thickness of layer 3 (denoted as H3), ranging from 40-145 nm. Each value in the table represents a simulated measurement simulated at the thickness values of layer 2 and layer 3 as indicated by the corresponding row and column. The simulation process for obtaining the simulated measurements can be performed in a similar manner as described above with reference to block 204 of FIG. 2.

When mapping the actual measurement of 0.622 with the simulated measurements listed in table 700 which are obtained under the same landing energy of 10 keV, it can be seen that four simulated measurements are identified as having the matching value of 0.622 (as highlighted in the table). The four matching measurements correspond to four different combinations of layer thickness of layers 2 and 3 that could result in the actual measurement. Therefore, it remains unknown which one of the four reflects the actual structural properties of the actual specimen.

For the purpose of solving this issue, at least one additional actual measurement needs to be acquired. An additional scan is performed using a landing energy whose value is changed from 10 keV to 20 keV. An additional actual measurement resulting from the additional scan is 0.305. The look-up table 702 illustrates simulated measurements corresponding to varying thickness values of layer 2 and layer 3, which are obtained under the landing energy of 20 keV.

When mapping the additional actual measurement of 0.305 with the simulated measurements listed in table 702, six simulated measurements are identified as having the matching value of 0.305 (as highlighted in the table 702). The six matching measurements correspond to six different combinations of layer thickness of layers 2 and 3 that could result in the actual measurement.

When comparing the locations of the four matching measurements in table 700 and the locations of the six matching measurements in table 702, it can be seen that only one location matches between the two tables, which is circled in both tables, representing the combination of 17 nm thickness of layer 2 and 100 nm thickness of layer 3. Therefore, by mapping between the actual measurements and the simulated measurements at corresponding landing energies, the actual property values of the two unknown structural properties can be revealed. By comparing the actual property values with the expected values as specified in the design data (20 nm for layer 2 and 100 nm for layer 3), the root cause can be identified as the layer thickness of layer 2 (17 nm) which deviates from the designed value of 20 nm.

It is to be noted that although tables 700 and 702 are illustrated as two separate two-dimensional tables, this is for purpose of illustration only. The two tables can be combined and represented as a three-dimensional lookup table where the third dimension represents the varying values of the landing energy.

Alternative to representing the simulation model using data informative of a multi-dimensional lookup table as illustrated in FIG. 3 and exemplified in FIG. 7, in some other embodiments, the simulation model can be represented as an analytical model. FIG. 4 illustrates a generalized flowchart of using an analytical model for identifying the root cause in accordance with certain embodiments of the presently disclosed subject matter.

The analytical model can be obtained (402), which is created based on a correlation relationship between the actual measurements (including the initial and additional actual measurements) with respect to the at least one scanning parameter, and the structural properties of the layers. By way of example, the relationship can be based on physical parameterizations of measurements or Monte Carlo simulation with respect to different structures (in terms of materials and geometries) of the layers. The actual measurement and the one or more additional actual measurements can be provided (404) as the input to the analytical model, which is capable of providing, as the output, actual values of the structural properties of the layers. The actual values of the structural properties can be compared (406) with expected values thereof as specified in the design data, thereby identifying the at least one structural property as the root cause.

Continuing with the example as described with reference to FIG. 7, where a simplified specimen is composed of three layers: a substrate bottom layer, a second layer made of gold (Au), and a third layer made of silicon-oxide (SiO). An analytical model can be defined based on a correlation relationship between the actual measurements, and the structural properties of the layers and the at least one scanning parameter, as represented by below equation for the present example:

$$H_{Au} = \frac{\dfrac{\eta_1 - \eta_{B1}}{E_{L2}^2} - \dfrac{\eta_2 - \eta_{B2}}{E_{L1}^2}}{C_{Au}\left(\dfrac{1}{E_1^2 E_{L2}^2} - \dfrac{1}{E_{L1}^2 E_2^2}\right)}$$

$$H_{SiO} = \frac{E_{L1}^2}{C_{SiO}}\left(\eta_1 - \eta_{B1} - \frac{C_{Au}}{E_1^2} H_{Au}\right)$$

The parameters listed in the above equations are defined as follows:

$H_{Au}$: layer thickness of the second layer (the gold layer)

$H_{SiO}$: layer thickness of the third layer (the silicon-oxide layer)

$\eta_1$: measured BSE yield (i.e., the actual measurement) at a first landing energy of $E_{L1} = 10$ keV $\eta_2$: measured BES yield (i.e., the actual measurement) at a second landing energy of $E_{L2} = 20$ keV $\eta_{B1}$: BSE yield from the substrate layer at $E_{L1} = 10$ keV calculated based on the parameterization as described above $\eta_{B2}$: BSE yield from the substrate layer at $E_{L2} = 20$ keV calculated based on the parameterization as described above $C_{SiO}$: constant based on material properties of silicon-oxide (SiO)

$C_{Au}$: constant based on material properties of gold (Au)

$E_1$: average energy of the electron beam after the SiO-layer at $E_{L1}$ $E_2$: average energy of the electron beam after the SiO-layer at $E_{L2}$ Assume the values of the parameters are obtained as follows: $\eta_1 = 0.62185$, $\eta_2 = 0.3053$, $\eta_{B1} = 0.217$, $\eta_{B2} = 0.209$, $C_{SiO} = 0.0379$, $C_{Au} = 1.99$, $E_1 = 9.595$ keV, $E_2 = 19.766$ keV. When providing the values to the equation, the thickness of the second layer and the third layer can be derived:

$$H_{Au} = 17 \text{ nm}, H_{SiO} = 99.2 \text{ nm}$$

When comparing the derived thickness values of the two layers with the expected values as specified in the design data (e.g., 20 nm and 100 nm respectively), it can be identified that the layer thickness of the gold layer deviates from the design value thereof, thus is regarded as the root cause of the measurement deviation.

It is to be noted that the above examples of simulation models, such as, e.g., the look-up table and the analytical model, are illustrated for exemplary purposes, and should not be regarded as limiting the present disclosure in any way. Other ways of realizing the simulation model can be implemented in addition or in lieu of the above. By way of example, in some cases, the simulation model can be implemented as a machine learning (ML) model. For instance, the ML model can be trained using a training set comprising simulated measurements corresponding to different combinations of varying values of the structural properties of the layers and the at least one scanning parameter selected from the set of scanning parameters, where the simulated measurements can be obtained, e.g., based on Monte Carlo simulation. The ML model, once trained, can be used to indicate which scanning parameter to select for the purpose of obtaining the actual measurements in runtime. When being fed with the actual measurements obtained at varying values of the selected scanning parameter, the ML model can provide the actual values of the structural properties, and/or the root cause of a measurement deviation.

The identified root cause can be used for the purpose of process control, such as, e.g., modifying a processing step in the fabrication process that is related to the root cause. For instance, in the example of FIG. 7, it is identified that the layer thickness of the gold layer deviates from the design value thereof, thus is regarded as the root cause of the measurement deviation. In such cases, the processing step of fabricating the gold layer can be investigated based on the decreased layer thickness (as compared to the design value), and measures can be taken to adjust/optimize the processing step, thus eliminating future deviations.

It is to be noted that the examples and embodiments illustrated in the present disclosure, such as, e.g., the examples of semiconductor specimens, the simulation process and techniques, the exemplified simulation models, etc., are illustrated for exemplary purposes, and should not be regarded as limiting the present disclosure in any way. Other appropriate examples/implementations can be used in addition to, or in lieu of the above.

Among advantages of certain embodiments of the presently disclosed subject matter as described herein is to provide a solution for identifying the root cause of a measurement deviation in a semiconductor specimen having a multi-layer structure characterized by various structural properties, without using destructive measures. This can be realized by performing additional scanning of the specimen using different scanning parameters (e.g., varying values of at least one scanning parameter), and acquiring additional actual measurements, thereby providing sufficient measurement data for determining the actual values of the various structural properties and identifying the root cause.

Among further advantages of certain embodiments of the presently disclosed subject matter as described herein is providing a specifically configured simulation model representative of simulated measurement distribution in a multi-dimensional property space characterized by the various structural properties of the plurality of layers and the at least one scanning parameter. The sufficient measurement data as acquired is provided to the simulation model which is capable of identifying the root cause property by mapping the actual measurements with simulated measurements and deriving the actual values of the structural properties, which are then compared with the expected values thereof as specified by design data.

It is to be understood that the present disclosure is not limited in its application to the details set forth in the description contained herein or illustrated in the drawings.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

What is claimed is:

1. A computerized system for examining a semiconductor specimen, the semiconductor specimen comprising a plurality of layers characterized by respective structural properties, the system comprising a processor and memory circuitry (PMC) configured to:

derive an actual measurement of the semiconductor specimen from image data acquired in response to scanning the semiconductor specimen by an electron beam tool using a set of scanning parameters with predefined values;

obtain a simulated measurement corresponding to the actual measurement, the simulated measurement derived from a simulated image resulting from simulation of one or more physical effects caused by one or more physical processes based on design data of the semiconductor specimen in accordance with the predefined values;

compare the actual measurement with the simulated measurement to identify a deviation with respect to a predefined tolerance; and identify at least one structural property from the respective structural properties of the plurality of layers as a root cause of the deviation by:

configuring the electron beam tool by varying a value of at least one scanning parameter from the set of scanning parameters one or more times, and scanning the semiconductor specimen one or more times using the electron beam tool, each time configured with a respective varied value, to acquire one or more additional actual measurements, and providing the actual measurement and the one or more additional actual measurements to a simulation model representative of a simulated measurement distribution in a multi-dimensional property space characterized by the respective structural properties of the plurality of layers and the at least one scanning parameter, thereby identifying the at least one structural property as the root cause.

2. The computerized system according to claim 1, wherein the respective structural properties comprise one or more geometric properties or one or more material properties of the plurality of layers.

3. The computerized system according to claim 1, further comprising the electron beam tool operatively connected to the PMC and configured to scan the semiconductor specimen using the set of scanning parameters with predefined values and generate the image data representative thereof by collecting backscattered electrons emitted from the specimen.

4. The computerized system according to claim 1, wherein the actual measurement is one of a contrast measurement, a gray level profile or a measurement derived therefrom, and a critical dimension measurement.

5. The computerized system according to claim 1, wherein the set of scanning parameters comprises: a landing energy, an energy filter, a tilt, and an angular filter of an electron beam tool.

6. The computerized system according to claim 1, wherein the simulation model is generated during a setup phase prior to runtime examination, and the simulated measurement is obtained using the simulation model to correspond to expected values of the respective structural properties of the layers as specified in the design data.

7. The computerized system according to claim 1, wherein the simulation model is generated in runtime, in response to the identification of the deviation.

8. The computerized system according to claim 1, wherein the simulation model comprises data informative of a multi-dimensional lookup table comprising simulated measurements corresponding to varying values of the respective structural properties of the plurality of layers and the one or more varying values of the at least one scanning parameter, and wherein the actual measurement and the one or more additional actual measurements are respectively mapped with the simulated measurements obtained at a predefined value and at the one or more varying values of the at least one scanning parameter, and wherein the at least one structural property is identified based on matching measurements indicated in the mapping.

9. The computerized system according to claim 1, wherein the simulation model is an analytical model created based on a correlation relationship between the actual measurements with respect to the at least one scanning parameter and the respective structural properties of the plurality of layers, and wherein the simulation model, given the actual measurement and the one or more additional actual measurements as an input, is capable of providing, as an output, actual values of the respective structural properties of the plurality of layers, which, when being compared with expected values thereof as specified in the design data, identifies the at least one structural property as the root cause.

10. The computerized system according to claim 1, wherein the one or more physical processes of the semiconductor specimen comprise a fabrication process, a scanning process in accordance with the predefined values, and a signal processing process.

11. The computerized system according to claim 1, wherein the at least one scanning parameter is selected from the set of scanning parameters based on a dependency of actual measurements on varying values of each scanning parameter in the set of scanning parameters.

12. The computerized system according to claim 1, wherein a first number of the one or more varying values of the at least one scanning parameter is determined based on a second number of structural properties of the plurality of layers having unknown values.

13. The computerized system according to claim 1, wherein the identified root cause is usable for modifying a processing step of a fabrication process that is related to the root cause.

14. A computerized method of examining a semiconductor specimen, the semiconductor specimen comprising a plurality of layers characterized by respective structural properties, the method comprising:

deriving an actual measurement of the semiconductor specimen from image data acquired in response to scanning the semiconductor specimen by an electron beam tool using a set of scanning parameters with predefined values;

obtaining a simulated measurement corresponding to the actual measurement, the simulated measurement derived from a simulated image resulting from simulation of one or more physical effects caused by one or more physical processes based on design data of the semiconductor specimen in accordance with the predefined values;

comparing the actual measurement with the simulated measurement to identify a deviation with respect to a predefined tolerance; and identifying at least one structural property from the respective structural properties of the plurality of layers as a root cause of the deviation by:

configuring the electron beam tool by varying a value of at least one scanning parameter from the set of scanning parameters one or more time, and scanning the semiconductor specimen one or more times using the electron beam tool each time configured with a respective varied value, to acquire one or more additional actual measurements, and providing the actual measurement and the one or more additional actual measurements to a simulation model representative of a simulated measurement distribution in a multi-dimensional property space characterized by the respective structural properties of the plurality of layers and the at least one scanning parameter, thereby identifying the at least one structural property as the root cause.

15. The computerized method according to claim 14, further comprising: using the electron beam tool to scan the semiconductor specimen using the set of scanning parameters with predefined values and generating the image data representative thereof by collecting backscattered electrons emitted from the specimen.

16. The computerized method according to claim 14, wherein the simulation model comprises data informative of a multi-dimensional lookup table comprising simulated measurements corresponding to varying values of the respective structural properties of the plurality of layers and the one or more varying values of the at least one scanning parameter, and wherein the actual measurement and the one or more additional actual measurements are respectively mapped with the simulated measurements obtained at a predefined value and at the one or more varying values of the at least one scanning parameter, and wherein the at least one structural property is identified based on matching measurements indicated in the mapping.

17. The computerized method according to claim 14, wherein the simulation model is an analytical model created based on a correlation relationship between the actual measurements with respect to the at least one scanning parameter and the respective structural properties of the plurality of layers, and wherein the simulation model, given the actual measurement and the one or more additional actual measurements as an input, is capable of providing, as an output, actual values of the respective structural properties of the plurality of layers, which, when being compared with expected values thereof as specified in the design data, identifies the at least one structural property as the root cause.

18. The computerized method according to claim 14, wherein the at least one scanning parameter is selected from the set of scanning parameters based on a dependency of actual measurements on varying values of each scanning parameter in the set of scanning parameters.

19. The computerized method according to claim 14, wherein a first number of the one or more varying values of the at least one scanning parameter is determined based on a second number of structural properties of the plurality of layers having unknown values.

20. A non-transitory computer readable storage medium tangibly embodying a program of instructions that, when executed by a computer, cause the computer to perform a method of examining a semiconductor specimen, the semiconductor specimen comprising a plurality of layers characterized by respective structural properties, the method comprising:

deriving an actual measurement of the semiconductor specimen from image data acquired in response to scanning the semiconductor specimen by an electron beam tool using a set of scanning parameters with predefined values;

obtaining a simulated measurement corresponding to the actual measurement, the simulated measurement derived from a simulated image resulting from simulation of one or more physical effects caused by one or more physical processes based on design data of the semiconductor specimen in accordance with the predefined values;

comparing the actual measurement with the simulated measurement to identify a deviation with respect to a predefined tolerance; and identifying at least one structural property from the respective structural properties of the plurality of layers as a root cause of the deviation by:

configuring the electron beam tool by varying a value of at least one scanning parameter from the set of scanning parameters one or more times, and scanning the semiconductor specimen one or more times using the electron beam tool each time configured with a respective varied value, to acquire one or more additional actual measurements, and providing the actual measurement and the one or more additional actual measurements to a simulation model representative of a simulated measurement distribution in a multi-dimensional property space characterized by the respective structural properties of the plurality of layers and the at least one scanning parameter, thereby identifying the at least one structural property as the root cause.

\* \* \* \* \*